United States Patent [19]

Francel et al.

[11] 4,446,241

[45] May 1, 1984

[54] LEAD-FREE AND CADMIUM-FREE GLASS FRIT COMPOSITIONS FOR GLAZING, ENAMELING AND DECORATING

[75] Inventors: Josef Francel, Toledo; Daniel R. Stewart, Maumee; Uriah Horn, Toledo, all of Ohio

[73] Assignee: Owens-Illinois, Inc., Toledo, Ohio

[21] Appl. No.: 392,974

[22] Filed: Jun. 28, 1982

[51] Int. Cl.$^3$ .................................................. C03C 1/00
[52] U.S. Cl. ....................... 501/14; 106/312; 501/15; 501/17; 501/21; 501/25; 501/64; 501/77; 501/78
[58] Field of Search ................ 501/14, 15, 17, 21, 501/77, 78, 64

[56] References Cited

U.S. PATENT DOCUMENTS

| | | | |
|---|---|---|---|
| 3,561,984 | 2/1971 | Eppler | 501/20 |
| 3,811,901 | 5/1974 | Bacon | 501/78 |
| 4,002,799 | 1/1977 | Dumesnil et al. | 501/15 |
| 4,172,733 | 10/1979 | Moritsu et al. | 501/21 |
| 4,316,963 | 2/1982 | Hommel et al. | 501/14 |
| 4,352,889 | 10/1982 | Takami et al. | 501/15 |

FOREIGN PATENT DOCUMENTS

| | | | |
|---|---|---|---|
| 54-116014 | 9/1979 | Japan | 501/21 |
| 55-7556 | 1/1980 | Japan | 501/21 |
| 55-7557 | 1/1980 | Japan | 501/21 |
| 55-20255 | 2/1980 | Japan | 501/21 |
| 55-20256 | 2/1980 | Japan | 501/21 |
| 55-109244 | 8/1980 | Japan | 501/21 |
| 554223 | 4/1977 | U.S.S.R. | 501/21 |

*Primary Examiner*—Helen M. McCarthy
*Attorney, Agent, or Firm*—David R. Birchall; Myron E. Click

[57] ABSTRACT

Glass frits for use in glazes or enamels have fiber softening point about 535°–609° C. are free of lead, cadmium and zinc and consist essentially of $Li_2O$-$B_2O_3$-$SiO_2$ plus 2–33% $SnO_2$+CaO and 2–23% $ZrO_2$+$La_2O_3$; also, $Al_2O_3$, SrO, BaO, $Na_2O$, F.

Low expansion filler, e.g., B-eucryptite, may be used at 4 to 15% by weight of glass frit.

14 Claims, No Drawings

LEAD-FREE AND CADMIUM-FREE GLASS FRIT COMPOSITIONS FOR GLAZING, ENAMELING AND DECORATING

The present invention relates to lead-free and cadmium-free glass frit compositions which possess desirable properties and characteristics which enable them to be used for glazing, enameling and for decorating a variety of food service ware; glassware such as tumblers, chinaware and the like. The compositions of this invention may also find use in selected applications such as microelectronics encapsulation, and for the formation of a light diffusing layer on a glass surface. The decorating glazes and glass compositions of the present invention have the advantage of containing no lead or cadmium components.

Most of today's commercially available food service ware is marketed with varying degrees of external ornamentation and decoration. Manufacturers of such ware have long recognized that decorated glassware has improved customer appeal and will sell better than undecorated ware. As a result, much effort over the years has gone into research and development relating to decorating compositions for all types of dinnerware, tableware, and food service ware in general.

Decorating compositions generally fall into two categories; glazes and enamels. The glazes are usually thought of as clear glasses, while enamels are glasses which contain a coloring material such as a pigment. In actual usage, the glazes and enamels are used in a finely divided form called a "frit", which is selectively applied to the surfaces of the glassware, glass-ceramic ware, chinaware and ceramic ware in accordance with the intended decorative or ornamental pattern. Any of several decorating techniques known in the industry can be used to achieve this result. Typically, the frit is in the form of a paste which consists of the finely divided glaze or enamel composition plus a vehicle. After application to the ware by silk screen or other technique, the ware is heated or fired to fuse the frit, volatilize the vehicle or medium and firmly bond the decoration to the surface of the ware.

According to the present state of the art, there are a variety of decorating compositions available which are used in the decorating of glassware, chinaware and the like, to produce selected patterns and ornamentation. Often times, these available compositions contain lead and/or cadmium oxides. Lead oxide was previously used in these compositions to lower the melting point of the frit so that the frit could be fused onto the surface of the ware at as low a temperature as possible to avoid thermal deformation of the ware. Cadmium oxide has been used in the past as a colorant in certain frits. Certain States of the Union have now enacted legislation prohibiting the use of cadmium and lead in glazes used for decorating of glassware and chinaware on the ground that these materials are allegedly toxic and that young children would be particularly susceptible to the allegedly toxic affects of these components. The present invention therefore eliminates risks associated with having allegedly toxic materials present in glazing and decorating compositions. Further, the present invention avoids the risk of possible recall of decorated ware in particular states which may in the future enact legislation prohibiting the use of cadmium and/or lead oxides in decorating compositions.

The present invention further eliminates the need for testing the content of decorative glazes and glass compositions to determine if the level of alleged toxic materials has been kept to the required minimum. Thus, the cost of compliance testing is overcome.

The decorative glaze compositions of the present invention contain no lead and cadmium oxides, thereby enabling the glass manufacturer to recover sales in those states which require or mandate zero lead or cadmium content in glassware sold in those states intended for drinking purposes or in chinaware that coms into contact with food.

The glasses of the present invention can have substantially lower densities than lead containing glasses. For example, (2.6842 vs. 4.5837). One pound of the new glasses has a higher volume than the previously commercially used decorating materials. The volume of glass available for printing controls the number of decorated glass pieces. For example, 1 pound of lead glass will print approximately 500 glass pieces of a specific design. In contrast, a typical lead-free glass of the invention in the amount of 1 pound will print approximately 850 pieces of the same design. This was arrived at through the following calculation:

| Volume per pound of material | |
|---|---|
| lead glass | Density 4.5837 g/cc |
| lead-free glass | Density 2.6842 g/cc |

$$\text{Lead: Volume}_1 = \frac{\text{Wt.}}{\text{Density}} = \frac{1 \text{ lb.}}{4.5837} = \frac{453.6 \text{ gm}}{4.5837} = 98.96 \text{ ml}$$

$$\text{No Lead: Volume}_2 = \frac{453.6}{2.6842} = 168.99 = 170 \text{ ml}$$

$$\text{Ratio 500 pieces} \times 1.7 = 850 \text{ pieces}$$

The present invention also provides a potential for lower raw material costs because of the avoidance of the need to use the relatively expensive lead and cadmium components. For the same reason, the present invention has a potential for lowering the cost of color pigments.

This is illustrated by the following:

The glass decorating glazes have minimum of two components:
A—Glass (=flux) and
B—Color Pigment (=stain)

The B part pigments are identical or similar in both lead and lead-free glasses to achieve the selected colors. The lead-free glass A part raw materials without tin oxide are cheaper than lead glasses. For example, a typical glass of the present invention could be 20% to 30% less expensive, as compared to the cost of one pound of lead containing glass.

A number of advantages characterize the present invention including the fact that the decorating compositions described herein meet the requirements of good decorating glasses, protective glazes and enamels without using allegedly toxic materials. It is important, particularly for the decoration of glassware and chinaware which is used in a home or restaurants, that the decorating compositions have sufficient alkali resistance and hardness so that they will be able to be exposed for many years to dishwashing cycles without serious degradation which would cause an unattractive deterioration of the decorated ware.

The present invention provides many compositions which can be harder and therefore more scratch resistant than compositions generally known in the art today. As a result, there are included among the compositions of the present invention those which are especially suited as top coats for chinaware. It has been determined by applicants that the pigmented glasses of the present invention are less sensitive to furnace atmosphere than are compositions known in the art especially those which contain certain cadmium pigments such as cadmium sulfide and cadmium selenide (CdS and CdSe, respectively) which are sensitive to oxidation. Depending on the particular formulations and components, the present invention provides compositions which, in general, have enhanced properties such as lower expansion, high hardness, high chemical resistance, particularly alkali resistance, and a sufficiently longer glassy range in relation to other lead-free glasses such as zinc oxide containing compositions.

In accordance with one feature of the present invention there are provided alumino-borosilicate compositions which may be used for glass and chinaware decorations and hybrid microelectric applications. In general, the compositions in accordance with this feature of the present invention are based on the $Al_2O_3$-$B_2O_3$-$SiO_2$ system, wherein there is also present lithia, $Li_2O$, and at least one other component selected from the group consisting of $ZrO_2$, $SnO_2$, $CeO_2$, $La_2O_3$, $CaO$, $SrO$, $BaO$, $Na_2O$, $ZrF_4$, $NaF$ and $3NaF.AlF_3$.

In another aspect of the invention, there are provided compositions which are free of added aluminum values in the form of $Al_2O_3$ and which are defined as containing substantial amounts of lanthanum oxide expressed as $La_2O_3$. These compositions are based on the $B_2O_3$-$SiO_2$-$ZrO_2$-$La_2O_3$ system and also contain lithia, $Li_2O$.

Characterized by good chemical resistance, the glasses of the present invention also have good gloss and smoothness. In addition, they have generally hard surfaces without containing allegedly toxic materials. Among the glasses of the present invention are those which may be fired in the temperature range of 580° C. to 630° C. at the normal rate and holding time, using conventional glassware and chinaware decorating lehrs.

In the industry today, it is important that the compositions used for the decoration of glassware and chinaware have the characteristics described below.

The decorative compositions should be capable of being fired in the firing range of 580° C. to 630° C. It is generally desired that the holding time at the peak temperature be in the range of 7 to 11 minutes, with the heating rate of 14° C. to 15° C. per minute. The time to reach the peak temperature should range to about 40 minutes + 10 minutes.

The compositions used for decorating should be capable of being fired to a smooth, shiny layer without "running out" of the printed area and at the same time being capable of forming fine lines with no bleeding, that is, the patterns produced on the glassware should be clear and crisp and should not be fuzzy, blurred or indistinct.

It is desirable that the decorated glassware and chinaware be capable of withstanding dishwasher cycles, preferably in the presence of rather strong detergent, for a range of 5 to 20 years. In addition, the decorated material on the glassware should not be removed or susceptible to attack by the acid normally encountered in fruit juices.

For applications such as art glass, electronic purposes and light diffusing coating the glasses do not need to possess acid and/or alkali resistance.

Finally, the decorated material should not exhibit any cracks after firing or develop any cracks in actual usage.

These properties, features and characteristics can be determined by quantitative test data as well as by observation. Therefore, a specific decorating composition can be evaluated to determine whether it will be satisfactory for commercial purposes. For example, decorated glassware can be subjected to dishwasher cycling tests. By subjecting the decorated ware to attack using 5% sodium pyrophosphate at 60° C. for 8 hours measured at 2-hour intervals, accelerated laboratory tests can be carried out to predict dishwasher resistance.

For the fruit juice test, generally two acids are used to determine the susceptibility of decorated glassware to attack. The first test is a 2% citric acid for 30 minutes at room temperature and the second test is a 4% acetic acid for 24 hours at room temperature.

Smoothness and the characteristics of the fired print definition can be predicted by a test which is called the "flow number" test. The flow number is calculated by the ratio of the measured width to the measured height of a fired sample pellet of the decorating composition. The pellet of the decorating composition is placed on a glass surface and the height of the pellet above the glass surface is measured. The measured width is the width of the pellet surface in contact with the glass surface. Good samples will have a flow number between 1 to 1.2. Numbers lower than 1 suggest lower glass adhesion. Numbers higher than 1.3 suggest a poor definition with run down from printed lines; that is, excessive bleeding of the paste.

Any fracturing or cracking tendencies in the decorated material are related to differences in the thermal contractions of the substrate glass or chinaware (tumbler or dinnerware) and the decorating glass from the peak temperature down to room temperature. These differences can be determined by the residual stress in the tumbler glass caused by the contracting decorating glass. For example, the test can be determined by using a sample cube with 2.5 mm edge which is fired in contact with the base glass with the desired heating rate, holding time and temperature and also cooling rate. The induced stress is measured by polarized light retardation in accordance with procedures known in the art.

The conversion is measured by using a test sample with a thickness of about 100 mils. The thickness of the fired decorating layer is about 1.2 to 2.3 mils. The measured stress values shown in the Table 1 which is set forth below are about 4 to 6 times greater than the expected stress values for fired screen printed decorating layers as determined experimentally. The test specimens were observed for cracking and the observations were recorded in Table 1. It is apparent that the pellet stresses up to approximately 1600 psi did not show cracks in the thin layers which range from 1.2 to 2.3 mils.

The above-mentioned test techniques and procedures are well known and documented in the field of glass technology.

It should be noted that the compositions of the present invention can be used in conventional screen printing techniques which are well known and understood in the art and do not form a part of this invention. Any such conventional screen printing methods can be used for purposes of the invention.

In its broadest aspects, the present invention relates to compositions based on a borosilicate glass system represented by the following listed components in the indicated weight percent ranges expressed on an oxide basis:

| Component | Weight Percent |
|---|---|
| $Al_2O_3$ | 0–30 |
| $B_2O_3$ | 16–32 |
| $SiO_2$ | 11–40 |
| $LiO_2$ | 4–12 |

The balance consisting of other compatible glass making components to be described in further detail below.

In addition to these listed ingredients, which form the base glass, the system generally further contains one or more of $ZrO_2$, $SnO_2$, $CeO_2$, $La_2O_3$, CaO, SrO, BaO, $Na_2O$, $ZrF_4$, NaF, and $3NaF.AlF_3$.

It will be noted that these compositions are zinc free. Whereas zinc has been used in decorating compositions and has been found useful in achieving low viscosity in glass at specific temperatures, zinc is listed as not desirable in drinking water and should be, limited to no more than about 5 mg/l.

More particularly, the glass compositions of the present invention contain the following components expressed in oxides in weight percent, based on the total composition.

| Component | Weight Percent |
|---|---|
| $Al_2O_3$ | 0–30 |
| $B_2O_3$ | 16–32 |
| $SiO_2$ | 11–40 |
| $Li_2O$ | 4–12 |
| $ZrO_2$ | 0–18 |
| $SnO_2$ | 0–20 |
| $CeO_2$ | 0–2 |
| $La_2O_3$ | 0–15 |
| CaO | 0–16 |
| SrO | 0–13 |
| BaO | 0–7 |
| $Na_2O$ | 0–3.5 |
| F | 0–2.6 | and wherein

| | |
|---|---|
| $\Sigma\ SnO_2 + CaO$ | 2–23 |
| $\Sigma\ ZrO_2 + La_2O_3$ | 2–33 |
| $\Sigma\ ZrO_2 + Al_2O_3$ | 0–26.5 |
| $\Sigma\ CaO + SrO + BaO$ | 0–19.25 |

Table 1 shows representative compositions of the present invention which have been found to materially improve the characteristics of decorated glassware and chinaware.

These compositions include those which have outstanding alkali resistance, and acceptable stress layers. Some compositions which have relatively high stresses which may cause some cracks can be remedied by including as fillers an appropriate amount of a low expansion ceramic such as beta-eucryptite. Some color pigments also function to lower the stress as is known in the art. Clays can be used as well as, mullite; quartz and the like.

In a further feature of the present invention, it has been found that the following compositions are especially well suited for the purposes described herein:

| Component | Weight Percent |
|---|---|
| $Al_2O_3$ | 19–20 |
| $B_2O_3$ | 28–30 |
| $SiO_2$ | 11–16 |
| $LiO_2$ | 4–8 |
| $ZrO_2$ | 4–7.5 |
| $SnO_2$ | 6–19 |
| $La_2O_3$ | 0–0.5 |
| CaO | 0–4 |
| SrO | 0–13 |
| BaO | 0–7 |
| $Na_2O$ | 0–0.25 |
| F | 0–1.5 |

Compositions falling within the above stated parameters have good fiber softening point data and develop a compressive stress, or low tensile stress, when tested for stress characteristics.

With the above preferred compositions of the invention, it may be noted that when $SnO_2$ is present in an amount of greater than 10% by weight, the amount of SrO should be less than 10%; conversely when SrO exceeds 10% then the amount of $SnO_2$ should be less than 10%. Also within the parameters stated above, the sum of CaO+BaO+SrO should be in the range of 6–21 with a maximum of 7% BaO and 5% CaO, with the added provision that there must always be either BaO or CaO present. Preferred compositions coming within the above ranges are those shown in Table 1, examples 5, 13, 14, 22 and 23.

Some compositions of the invention are colorless and therefore may be used as a barrier or top coating onto conventional decorating compositions which may contain lead and cadmium in order to prevent or retard lead and cadmium release from the decorated surfaces.

The following examples, with the exception of example 15, illustrate the invention without being intended to limit it in any way. Example 15 is intended for purposes of comparison. The compositions were recalculated to the standard normal oxide percentages. In compositions 1, 5–9, 16, cryolite ($3NaF.AlF_3$) was used, in examples 5, 7, 8, 12–14, and 18, $ZrF_4$ was added; in compositions 3, 4 and 15 zircon was added; in compositions 4, 11, 15 and 17 L NaF was used. Therefore, in the respective examples, zircon was changed to $ZrO_2$ and $SiO_2$ percentages, NaF into F and $Na_2O$ percentages, $ZrF_4$ into F and $ZrO_2$ percentages and cryolite into F, $Na_2O$ and $Al_2O_3$ percentages. In this table, the symbols "A" and "C" indicate acetic acid and citric acid respectively.

TABLE 1

| Glass No. | GLASS COMPOSITIONS (1–12) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| % Loss Alk. | 0.62 | 0.49 | 1.44 | 1.08 | 1.28 | 1.77 | 1.99 | 1.94 | 1.77 | 1.61 | 1.77 | 2.3 |
| % Loss Acids A | 7.34 | 12.78 | 5.93 | 16.33 | 2.87 | 2.83 | 4.78 | 4.06 | 8.54 | 7.40 | 8.70 | 11.4 |
| % Loss Acids C | 4.72 | 9.18 | 8.36 | 11.42 | 1.74 | 1.53 | 1.94 | 3.82 | 4.25 | 5.20 | 6.60 | 4.8 |
| Composition | | | | | | | | | | | | |
| $Al_2O_3$ | 19.0 | 20.0 | 20.0 | 20.0 | 19.7 | 20.0 | 20.0 | 20.0 | 19.25 | 20.0 | 18.0 | 20.0 |
| $B_2O_3$ | 29.0 | 28.0 | 29.0 | 29.0 | 28.25 | 28.2 | 28.0 | 28.0 | 29.0 | 28.0 | 28.0 | 28.0 |

TABLE 1-continued

| | | | | | | | | | | | | |
|---|---|---|---|---|---|---|---|---|---|---|---|---|
| $Li_2O$ | 6.0 | 8.0 | 6.0 | 6.0 | 7.5 | 7.5 | 7.5 | 7.5 | 6.0 | 8.0 | 8.0 | 8.0 |
| $SiO_2$ | 18.0 | 16.0 | 16.0 | 16.0 | 12.75 | 12.75 | 12.55 | 12.75 | 18.0 | 16.0 | 18.0 | 16.0 |
| $ZrO_2$ | 5.0 | 5.0 | 5.0 | 5.0 | 6.10 | 5.0 | 6.0 | 6.11 | 5.0 | 5.0 | 5.0 | 6.5 |
| $SnO_2$ | 0 | 10.0 | 2.0 | 0 | 14.22 | 12.25 | 12.22 | 4.25 | 0 | 10.0 | 5.0 | 10.0 |
| $CeO_2$ | 0 | 0 | 2.0 | 2.0 | 0 | 0 | 0 | 0 | 2.0 | 0 | 0 | 0 |
| $La_2O_3$ | 2.0 | 0 | 0 | 0 | 0.5 | 0.5 | 0.5 | 0.5 | 0 | 0 | 0 | 0 |
| CaO | 16.0 | 0 | 16.0 | 16.0 | 4.0 | 7.5 | 6.0 | 14.0 | 16.0 | 13.0 | 13.0 | 3.0 |
| SrO | 0 | 13.0 | 0 | 0 | 0 | 0 | 0 | 0 | 0 | 0 | 0 | 5.0 |
| BaO | 0 | 0 | 1.0 | 0 | 5.25 | 5.25 | 5.25 | 5.25 | 0 | 0 | 0 | 3.0 |
| $Na_2O$ | 3.0 | 0 | 3.0 | 3.0 | 0.8 | 0.8 | 0.8 | 0.5 | 3.0 | 0 | 3.0 | 0 |
| F | 2.0 | 0 | 0 | 3.0 | 0.93 | 0.25 | 1.18 | 1.14 | 1.75 | 0 | 2 | 0.5 |
| F.S.P. °C. DTA | 552 | 567 | 583 | 557 | 538 | 559 | 537 | 556 | 549 | 577 | 556 | 560 |
| Flow | 1.144 | 1.040 | 1.031 | 1.181 | 1.200 | 1.155 | 1.209 | 1.181 | 1.125 | 1.010 | 1.126 | 1.101 |
| Stress psi | 1700T | 1425T | 1050T | 1700T | 450C | 1310T | 1620T | 1700T | 1750T | 1515T | 2060T | 1060T |
| Cracks | Yes | No | No | Yes | No | No | No | Yes | Yes | No | Yes | No |
| Σ $SnO_2$ + CaO | 16 | 10 | 18 | 16 | 18.22 | 19.75 | 18.22 | 18.25 | 16 | 23 | 18 | 13 |
| Σ $ZrO_2$ + $La_2O_3$ | 7 | 5 | 5 | 5 | 6.6 | 5.5 | 6.5 | 6.61 | 5 | 5 | 5 | 6.5 |
| Σ $ZrO_2$ + $Al_2O_3$ | 24 | 25 | 25 | 25 | 25.8 | 25 | 26 | 26.11 | 24.25 | 25 | 23 | 26.5 |
| Σ CaO + SrO + BaO | 16 | 13 | 17 | 16 | 9.25 | 12.75 | 11.25 | 19.25 | 16 | 13 | 13 | 11 |

GLASS COMPOSITIONS (13–24)

| Glass No. | 13 | 14 | 15 | 16 | 17 | 18 | 19 | 20 | 21 | 22 | 23 | 24 |
|---|---|---|---|---|---|---|---|---|---|---|---|---|
| % Loss Alk. | 1.99 | 2.21 | 3.18 | 3.07 | 2.56 | 4.2 | 4.46 | 5.9 | 2.67 | 2.05 | 1.94 | 0.7 |
| % Loss Acids A | 6.80 | 6.40 | 15.87 | 12.3 | 13.80 | 13.6 | 14.97 | 16.6 | 16.48 | 7.54 | 6.33 | 8.43 |
| % Loss Acids C | 2.30 | 1.40 | 10.4 | 7.7 | 6.20 | 3.4 | 4.58 | 6.23 | 6.10 | 3.42 | 4.21 | 3.41 |
| Composition | | | | | | | | | | | | |
| $Al_2O_3$ | 20.0 | 20.0 | 20.0 | 18.70 | 18.0 | 20.0 | 20.0 | 20.0 | 20.0 | 20.0 | 20.0 | 0 |
| $B_2O_3$ | 28.0 | 28.0 | 29.0 | 29.0 | 29.0 | 28.0 | 28.0 | 28.0 | 28.0 | 30.0 | 29.0 | 30.0 |
| $Li_2O$ | 8.0 | 8.0 | 6.0 | 6.0 | 6.0 | 8.0 | 8.0 | 8.0 | 8.0 | 4.0 | 6.0 | 7.0 |
| $SiO_2$ | 14.0 | 11.0 | 15.80 | 18.0 | 18.0 | 14.0 | 15.0 | 10.0 | 16.0 | 15.0 | 16.0 | 28.0 |
| $ZrO_2$ | 6.5 | 6.5 | 5.0 | 5.0 | 5.0 | 6.5 | 3.0 | 6.5 | 5.0 | 4.0 | 5.0 | 18.0 |
| $SnO_2$ | 15.0 | 19.0 | 0 | 0 | 0 | 15.0 | 10.0 | 20.0 | 7.0 | 6.0 | 7.0 | 0 |
| $CeO_2$ | 0 | 0 | 2.0 | 2.0 | 2.0 | 0 | 0 | 0 | 0 | 0 | 0 | 0 |
| $La_2O_3$ | 0 | 0 | 0 | 0 | 0 | 0 | 0 | 0 | 0 | 0 | 0 | 15.0 |
| CaO | 3.0 | 0 | 14.0 | 16.0 | 16.0 | 0 | 0 | 0 | 2.0 | 4.0 | 3.0 | 2.0 |
| SrO | 4.0 | 0 | 0 | 0 | 0 | 8.0 | 16.0 | 0 | 11.0 | 13.0 | 11.0 | 0 |
| BaO | 0 | 7.0 | 0 | 0 | 0 | 0 | 0 | 7.0 | 3.0 | 4.0 | 3.0 | 0 |
| $Na_2O$ | 0 | 0 | 5.60 | 3.3 | 3.5 | 0 | 0 | 0 | 0 | 0 | 0 | 0 |
| F | 1.5 | 0.5 | 2.60 | 2.0 | 2.5 | 0.5 | 0 | 0.5 | 0 | 0 | 0 | 0 |
| F.S.P. °C. DTA | 567 | 535 | 549 | 558 | 565 | 565 | 557 | 537 | 573 | 565 | 576 | 606 |
| Flow | 1.081 | 1.272 | 1.200 | 1.082 | 1.082 | 1.141 | 1.103 | 1.381 | 1.095 | 1.0210 | 0.905 | 1.020 |
| Stress psi | 1080C | 805T | 1945T | 2365T | 1800T | 1200T | 1765T | 1265T | 1615T | 1245C | 1435C | 630C |
| Cracks | No | No | Yes | Yes | Yes | No | Yes | No | Yes | No | No | No |
| Σ $SnO_2$ + CaO | 18 | 19 | 14 | 16 | 16 | 15 | 10 | 20 | 9 | 10 | 10 | 2 |
| Σ $ZrO_2$ + $La_2O_3$ | 6.5 | 6.5 | 5 | 5 | 5 | 6.5 | 3 | 6.5 | 5 | 4 | 5 | 33 |
| Σ $ZrO_2$ + $Al_2O_3$ | 26.5 | 26.5 | 25 | 23.7 | 23 | 26.5 | 23 | 26.5 | 25 | 24 | 25 | 18 |
| Σ CaO + SrO + BaO | 7 | 7 | 14 | 16 | 16 | 8 | 16 | 7 | 16 | 21 | 17 | 2.0 |

GLASS COMPOSITIONS (25–37)

| Glass No. | 25 | 26 | 27 | 28 | 29 | 30 | 31 | 32 | 33 | 34 | 35 | 36 | 37 |
|---|---|---|---|---|---|---|---|---|---|---|---|---|---|
| % Loss Alk. | 0.64 | 0.85 | 0.79 | 0.88 | 0.42 | 0.86 | 1.04 | 1.45 | 2.43 | 3.79 | 2.77 | 3.21 | 2.21 |
| % Loss Acids A | 7.72 | 12.22 | 8.14 | 8.55 | 3.33 | 6.22 | 5.42 | 4.20 | 6.89 | 4.80 | 6.41 | 6.61 | 2.58 |
| % Loss Acids C | 2.83 | 4.81 | 6.20 | 3.80 | 3.66 | 5.74 | 6.73 | 3.47 | 9.09 | 5.87 | 5.79 | 6.12 | 2.50 |
| Composition | | | | | | | | | | | | | |
| $Al_2O_3$ | 0 | 0 | 0 | 0 | 0 | 0 | 0 | 0 | 2.0 | 0 | 30.0 | 17.0 | 15 |
| $B_2O_3$ | 30.0 | 30.0 | 30.0 | 32.0 | 30.0 | 24.0 | 24.0 | 24.0 | 24.0 | 24.0 | 16.0 | 25.0 | 32.0 |
| $Li_2O$ | 7.0 | 7.0 | 7.0 | 7.0 | 8.0 | 9.0 | 9.0 | 8.0 | 5.0 | 8.0 | 12.0 | 8.0 | 8.0 |
| $SiO_2$ | 30.0 | 30.0 | 30.0 | 30.0 | 35.0 | 40.0 | 40.0 | 40.0 | 40.0 | 40.0 | 40.0 | 28.0 | 29.0 |
| $ZrO_2$ | 16.0 | 14.0 | 12.0 | 12.0 | 10.0 | 5.0 | 5.0 | 3.0 | 4.0 | 0 | 0 | 4.0 | 4.0 |
| $SnO_2$ | 0 | 0 | 0 | 0 | 2.0 | 1.0 | 1.0 | 1.0 | 0 | 0 | 0 | 0 | 0 |
| $CeO_2$ | 0 | 0 | 0 | 0 | 0 | 0 | 0 | 0 | 0 | 0 | 0 | 0 | 0 |
| $La_2O_3$ | 15.0 | 15.0 | 15.0 | 13.0 | 15.0 | 15.0 | 13.0 | 13.0 | 13.0 | 15.0 | 2.0 | 6.0 | 0 |
| CaO | 2.0 | 4.0 | 6.0 | 6.0 | 0 | 3.0 | 5.0 | 8.0 | 9.0 | 10.0 | 0 | 9.0 | 9.0 |
| SrO | 0 | 0 | 0 | 0 | 0 | 0 | 0 | 0 | 0 | 0 | 0 | 9.0 | 0 |
| BaO | 0 | 0 | 0 | 0 | 0 | 0 | 0 | 0 | 0 | 0 | 0 | 0 | 0 |
| $Na_2O$ | 0 | 0 | 0 | 0 | 0 | 3.0 | 3.0 | 3.0 | 3.0 | 3.0 | 0 | 3.0 | 3 |
| F | 0 | 0 | 0 | 0 | 0 | 0 | 0 | 0 | 0 | 0 | 0 | 0 | 0 |
| F.S.P. °C. DTA | 595 | 609 | 597 | 596 | 590 | 573 | 574 | 578 | 606 | 574 | 581 | 567 | 573 |
| Flow | 1.063 | 1.010 | 1.030 | 1.052 | 1.030 | 1.074 | 1.099 | 1.021 | 1.010 | 1.147 | 1.117 | 1.042 | 1.074 |
| Stress psi | 415C | 1180T | 1390T | 1350T | 1040T | 600T | 1200T | 850T | 1060T | 1795T | 1180C | 380T | 310C |
| Cracks | No | No | No | No | No | No | No | No | No | Yes | No | No | No |
| Σ $SnO_2$ + CaO | 2 | 4 | 6 | 6 | 2 | 4 | 6 | 7 | 9 | 10 | 0 | 9 | 9 |
| Σ $ZrO_2$ + $La_2O_3$ | 31 | 29 | 27 | 25 | 25 | 20 | 18 | 16 | 17 | 15 | 2 | 4 | 4 |
| Σ $ZrO_2$ + $Al_2O_3$ | 16 | 14 | 12 | 12 | 10 | 5 | 5 | 3 | 6 | 0 | 30 | 21 | 19 |
| Σ CaO + SrO + BaO | 2 | 4 | 6 | 6 | 0 | 3 | 5 | 8 | 9 | 10 | 0 | 18 | 9 |

From the foregoing tables, it will be seen that for those compositions containing aluminum oxide the components included the following in the indicated weight percent ranges based on oxides:

| Component | Weight Percent |
| --- | --- |
| Al$_2$O$_3$ | 15–30 |
| B$_2$O$_3$ | 16–32 |
| Li$_2$O | 4–12 |
| SiO$_2$ | 8–40 |
| ZrO$_2$ | 3–6.5 |
| SnO$_2$ | 0–20 |
| CeO$_2$ | 0–2 |
| La$_2$O$_3$ | 0–6 |
| CaO | 0–16 |
| SrO | 0–13 |
| BaO | 0–7 |
| Na$_2$O | 0–3.5 |
| F | 0–3 | wherein from example 1 to 23:

| | | |
| --- | --- | --- |
| Σ SnO$_2$ + CaO | is | 9 to 23% |
| Σ ZrO$_2$ + La$_2$O$_3$ | is | 3 to 7% |
| Σ ZrO$_2$ + Al$_2$O$_3$ | is | 23 to 26.5% |
| Σ CaO + SrO + BaO | is | 7 to 21% |

Within the above ranges were those compositions which exhibited no cracks in the tests. These compositions contain the following ingredients:

| Component | Weight Percent |
| --- | --- |
| Al$_2$O$_3$ | 15–30 |
| B$_2$O$_3$ | 16–32 |
| Li$_2$O | 4–12 |
| Li$_2$O | 4–12 |
| SiO$_2$ | 10–40 |
| ZnO$_2$ | 4–6.5 |
| SnO$_2$ | 0–20 |
| CeO$_2$ | 0–2 |
| La$_2$O$_3$ | 0–6 |
| CaO | 0–16 |
| SrO | 0–13 |
| BaO | 0–7 |
| Na$_2$O | 0–3 |
| F | 0–1.5 | wherein generally:

| | | |
| --- | --- | --- |
| Σ SnO$_2$ + CaO | is | 10 to 23% |
| Σ ZrO$_2$ + La$_2$O$_3$ | is | 4 to 6.5% |
| Σ ZrO$_2$ + Al$_2$O$_3$ | is | 24 to 26.5% |
| Σ CaO + SrO + BaO | is | 7 to 21% |

Within the broad group of alumino-borosilicate compositions are those exemplified by glass numbers 35, 36 and 37 in the above table. In this group of glasses ΣSnO$_2$+CaO is 0–9, ΣZrO$_2$+La$_2$O$_3$ is 2–4%, ΣZrO$_2$+Al$_2$O$_3$ is 19–30 and ΣCaO+SrO+BaO is 0–18%.

The foregoing tables also show compositions that are free of added aluminum oxide, or very low amounts; i.e. on the order of 2% or less. These compositions can be expressed by the following listed ingredients in the indicated weight percent based on oxides.

| Components | Weight Percent |
| --- | --- |
| Al$_2$O$_3$ | 0–2 |
| B$_2$O$_3$ | 24–32 |
| Li$_2$O | 5–9 |
| SiO$_2$ | 16–40 |
| ZrO$_2$ | 0–18 |
| CaO | 0–10 |
| SrO | 0–3 |
| Na$_2$O | 0–3 | wherein:

| | | |
| --- | --- | --- |
| Σ SnO$_2$ + CaO | is | 2–10% |
| Σ ZrO$_2$ + La$_2$O$_3$ | is | 15–33% |
| Σ ZrO$_2$ + Al$_2$O$_3$ | is | 0–18% |
| Σ CaO + SrO + BaO | is | 0–10% |

Of these compositions some compositions exhibited no cracks and may be expressed by the following listed components in the indicated amounts in weight percent based on oxides.

| Component | Weight Percent |
| --- | --- |
| B$_2$O$_3$ | 24–30 |
| Li$_2$O | 5–9 |
| SiO$_2$ | 28–40 |
| ZrO$_2$ | 3–18 |
| SnO$_2$ | 0–2 |
| La$_2$O$_3$ | 13–15 |
| CaO | 0–9 |
| Na$_2$O | 0–3 | and wherein:

| | | |
| --- | --- | --- |
| Σ SnO$_2$ + CaO | is | 2–9% |
| Σ ZrO$_2$ + La$_2$O$_3$ | is | 17–33% |
| Σ CaO + SrO + BaO | is | 0–9% |

To determine hardness of the glasses of the invention, the Knoop Hardness Numbers (KHN) were measured for the glasses set forth in Table 1 (above). They ranged from 520–594. Commercially used lead glasses ranged from 250–300, in the same Knoop Hardness Numbers. KHN's are values of hardness expressed as the load in kilograms divided by the projected area of a diamond penetration in millimeters corrected for the resolution of the used microscope. E. G. Shand shows KHN's for soda-lime glasses from 445–490, for alumino-silicate glasses ~550. (E. B. Shand, "Glass Engineering Handbook", pg. 42, McGraw Hill, 1958).

It therefore appears that the glasses of this invention are exceptionally harder than lead containing decorating glasses (520 vs. 250), they are somewhat harder than soda-lime glasses (520 vs. 490) and similar to alumin-silicate glasses.

As previously mentioned, clear coatings may be prepared from compositions of the present invention and then employed as glazes or overcoats for other ware. To illustrate this embodiment of the invention, lead and cadmium containing glasses were overprinted with glass No. 1 of Table 1 and cofired. When tested for alkali resistance, the coated samples were suprerior. They also showed high gloss and more intense color. The following Table A lists the results obtained with the three most critical colors: red, orange and yellow—comparing coated and uncoated samples. The samples did not have any cracks eventhough glass No. 1 has a relatively high stress.

TABLE A

Coated and Uncoated Lead and Cadmium Containing Glass Samples

|  | Red | | Orange | | Yellow | |
| --- | --- | --- | --- | --- | --- | --- |
|  | Uncoated | Coated | Uncoated | Coated | Uncoated | Coated |
| % Alkali Loss | 2.19 | 1.03 | 1.14 | 0.70 | 1.58 | 1.15 |
| Gloss | Lost | Retained | Low | High | Low | Medium |
| Color | Dull | Intense | Good Better | Slightly | Good | Good |
| Cracks | No | No | No | No | No | No |

The compositions of the present invention can be used to produce a wide range of pigment colors. The desirable colors are obtained by adding color pigments to a base glass (in single component) such as shown in Table 1 or to a mixture of two or more glasses or to a mixture of glass plus filler. The range of color pigments addition is from 0.5% to 15% by weight. The low limit 0.5% of white titania oxide is used to achieve white translucent color effects commonly used in so-called "etched glassware". The upper limit of 15% is used in complex color requiring several pigments including opacifier agents. The most useful range is from 4% to 12% of pigments used for all basic and relatively simple color tones like black, white, yellow, orange, browns and tans.

Table 2 lists several important colors: yellow, orange, brown and maroon with their characteristics. These results illustrated the stress reductions achieved by additions of the low expansion filler β-eucryptite from 1700T to 320C. The pigment chemistry is shown on line 2 of Table 2. From 1 to 15% pigment is generally used. Line 3 lists the percentage of the color pigment used. β-eucryptite percentage is shown on line 4. The loss in weight in accelerated alkali test is listed on line 6. Line 7 shows the induced stress as explained above. Sample No. 6 had stress of 945 psi tension and it did not show any cracks. The thin printed and fired layer had a stress of 160 psi tension. This approach to decreasing the induced stresses has a disadvantage of less smoothness and gloss due to relatively coarse (20–44 microns) β-eucryptite particles used for better results. Low expansion β-eucryptite is described in pending U.S. patent application Ser. No. 286,105 filed July 22, 1981 of Perry Pirooz, the entire disclosure of which is relied on and incorporated herein by reference. From about 5 to 15% of low expansion fillers may be used to prepare colored enamel in accordance with this aspect of the invention.

It was found that the present compositions such as illustrated in Table 1 having high tension stresses and cracks can be enhanced by incorporating low thermal expansion fillers which effectively reduce the apparent stress of this composite mixture. Additions from 1% to 15% of e.g., β-eucryptite were effective reducers of high tensions. The amount of these fillers depends on the original stress of the base glass used. For example, glass No. 21 requires only 1% of β-eucryptite to eliminate visible cracks. Composition No. 16 needs maximum of 15% of β-eucryptite to pass the no crack criteria.

Although many glasses of Table 1 can be used as single base glass components, they are some with high tension stresses. This stress can be decreased to the good level by addition of another glass from in Table 1 with compression stress or very low tension stress. This second component glass is selected from listed glasses like No. 5, 13, 22 and 23. It was found experimentaly that small amounts of 2% additions of the above glasses will decrease the tension stress below the cracking limit. These glasses can be added up to 95% to form useful combinations. Consequently, range of selected glasses is from 1% to 99%. The proper selection is made by the specific requirements of the flow numbers for the specific color pigments. Some pigments decrease the flow substantially and others have very little or no effect on flow number.

For example, the glasses No. 4 and No. 13 have good flows as single components (1.200, 1.081, 1.020). On the other hand, glass No. 23 is less flowing and requires addition of No. 1 glass.

To illustrate this aspect of the invention, curved 6 ounce orange juice tumblers (Bolero) were printed by Hot Melt (hot wax) inks with "wheat" design, with several colors ranging from yellow to orange, by a technique known as "blend". Two basic colors are blended together at the middle of the screen to achieve a variety of color shades. In Table 3, the six samples used glass No. 13 and glass No. 1 with the ratio No. 13 to No. 1 from 1 to 3. Tumbler No. 6 had ratio 1 and tumbler No. 5 had ratio 3 as seen below. Small amounts of low expansion fillers were added to this mixture (e.g. 2% β-eucryptite+1% Cer-Vit ® C-101). Table No. 3 lists the obtained results. The best results are listed under tumblers No. 1 to 3. The glass in these color mixtures was finely ground to less than 12 microns.

TABLE 2

COLORS

| Color | 1 Maroon | 2 Yellow | 3 Brown | 4 Buff Tan | 5 Deep | 6 Orange | 7 |
| --- | --- | --- | --- | --- | --- | --- | --- |
| Pigment | $Fe_2O_3$ | CrNbTi | FeZr | FeZnTi | FeZn | CrWTi | |
| % Pigment | 2 | 5 | 5 | 5 | 5 | 10 | |
| % Filler | 13 | 13 | 13 | 13 | 13 | 13 | Beta-Eucryptite |
| % Loss Alk. | 1.85 | 1.69 | 1.76 | 1.11 | 1.62 | 0.89 | |
| Flow | 1.071 | 1.020 | 1.060 | 1.050 | 1.062 | 1.031 | |
| Stress | 200C | 315C | 320C | 800T | 610T | 945T | Pellet about 100 mils |
| Cracks | No | No | No | No | No | No | |
| Base Glass | 1 | 1 | 1 | 1 | 1 | 1 | |

Tumblers No. 4 and 6 were printed by exactly the same mixture as tumblers No. 1-3, but with particles sizes less than 44 microns (−325 mesh). The alkali losses in percentages were calculated from total loss in weight by substracting the weight losses due to the unprinted tumbler.

TABLE 3

TUMBLERS - WHEAT DESIGN

| Tumbler | 1 | 2 | 3 | 4 | 5 | 6 |
|---|---|---|---|---|---|---|
| % Loss Alk. | 0.5 | 1.0 | 0.8 | 1.32 | 1.38 | 3.11 |
| % Loss Acids | 2.93 | 2.57 | 1.64 | 5.74 | 7.45 | 4.38 |
| Flow | 1.060 | 1.020 | 1.043 | 1.040 | 1.020 | 1.051 |
| Stress | 250C | 315C | 260C | 715C | 825C | 815T |
| Ratio $\frac{Glass\ 13}{Glass\ 1}$ | 2 | 2.2 | 2 | 2.6 | 3 | 1 |

The stress numbers in Table 1 can be converted to the standard coefficients of thermal expansion $\alpha \times 10^{-7}$ per degree Centigrade (0°-300° C.) by a experimentally determined conversion factor 154-per unit of expansion. The listed stress numbers divided by the factor of 154 yields units of thermal expansion differences between the base glass (the tumbler glass) with a coefficient ($\alpha$) of $83 \times 10^{-7}$ per °C. and the glasses of this invention. The compression stresses indicate thermal expansions lower than the tumbler glass and the tensions indicate thermal expansions higher than the base glass. Consequently, when tension is observed, the calculated units are added to the $83 \times 10^{-7}$ per °C. On the other hand, when compression stresses are observed, the calculated units are subtracted from the $83 \times 10^{-7}$ per °C.

For example, in sample No. 1, the observed stress is 1700. The calculation is then carried out as follows:

1700 tension divided by 154 = 11.04 units
83 + 11.04 = 94.04 × 10⁻⁷ per °C.

This compares favorably to a measured value of $94.1 \times 10^{-7}$ per °C.

In another illustration, for sample No. 13, a compression stress of 1080 was measured.

1080C divided by 154 = 7.01
83 − 7.01 = 75.99 compared to the measured value of 76.1.

For sample No. 5, the compression stress was mesured as 460.

460C divided 154 = 2.99
83 − 2.99 = 80.01 compared to measured value of 80.00.

In making the glasses as shown in Table 1, various ingredients were melted; generally, in quantities ranging from 10 to 50 pounds. Glass No. 1 was made in a quantity of 3,000 pounds using the following batch compositions which are typical raw materials which can be used for forming the glasses of the invention.

The following composition is based on a 100 pounds of batch material or approximately 85 pounds of the resulting glass:

| Batch Ingredients | Amounts |
|---|---|
| Glass Sand | 7.7 |
| Alumina (A-10) | 12.7 |
| Anhydrous Boric Acid | 23.6 |
| Lithium Carbonate | 12.0 |
| Lamthanum Carbonate | 2.5 |
| Nepheline-Syenite | 7.8 |
| Cryolite | 4.0 |
| Milled Zircon | 6.1 |
| High Calcite Limestone | 23.6 |

| Batch Ingredients | Amounts |
|---|---|
| | 100 pounds |

The above-identified batch materials were melted at a temperature of 2200° F. for 2 hours. The melt was stirred eight times and thereafter cooled. The glass was then formed into chips by using a water-cooled rolling mill in accordance with conventional procedures. Because of the high volatilization rate, it is desirable to minimize the loss of boric oxide. The chips formed should be clear and transparent without any opaque inclusions which may evidence the presence of undissolved alumina. Stirring is necessary in order to minimize separation of the top layer which contains boric acid and silica and a bottom layer which contains alumina and zircon.

Two additional batch compositions are shown below to illustrate the type of materials used for purposes of the invention.

| Batch Raw Materials | Grams |
|---|---|
| Ottawa 290 (sand) | 27.8566 |
| Anhydrous boric acid | 36.8717 |
| Calcined Kyanite | 59.6637 |
| Milled Zircon | 11.9792 |
| Anhydrous borax | 19.9661 |
| Lithium carbonate | 39.3631 |
| Stontium carbonate | 25.4686 |
| Lanthanum oxide | 11.9393 |

Total Batch 233.1082 gas. Total glass weight 200.000 grams. Fusion loss 33.1082 grams.

| Batch Raw Materials | Grams |
|---|---|
| Ottawa 290 (sand) | 32.4947 |
| Anhydrous boric acid | 51.0280 |
| Calcined Kyanite | 52.5354 |
| Milled Zircon | 11.9665 |
| Anhydrous Borax | 19.9441 |
| Lithium carbonate | 39.3203 |
| High Calcite Limestone | 32.6886 |

Total batch 239.9777 grams. Total glass weight 200.000 grams. Fusion loss 39.777 grams.

The fiber softening point range for these compositions is 535° C. to 609° C.

Further variations and modifications will become apparent to those skilled in the art from the foregoing and are intended to be encompassed by the claims which follow.

We claim:

1. A lead-free, cadmium-free and zinc-free glass frit composition having a fiber softening point of about 535° C. to about 609° C. consisting essentially of the following components present in the indicated approximate weight percent ranges based on the total composition:

| Component | Weight Percent |
|---|---|
| $Al_2O_3$ | 0–30 |
| $B_2O_3$ | 16–32 |
| $SiO_2$ | 11–40 |
| $Li_2O$ | 4–12 |
| $ZrO_2$ | 0–18 |
| $SnO_2$ | 0–20 |
| $CeO_2$ | 0–2 |
| $La_2O_3$ | 0–15 |

-continued

| Component | Weight Percent |
|---|---|
| CaO | 0–16 |
| SrO | 0–13 |
| BaO | 0–7 |
| Na$_2$O | 0–3.5 |
| F | 0–2.6 | and wherein

| | | |
|---|---|---|
| Σ SnO$_2$ + CaO | is | 2–23 |
| Σ ZrO$_2$ + La$_2$O$_3$ | is | 2–33 |
| Σ ZrO$_2$ + Al$_2$O$_3$ | is | 0–26.5 |
| Σ CaO + SrO + BaO | is | 0–19.25 |

2. The glass frit composition according to claim 1 and consisting essentially of the following components present in the indicated weight percent ranges based on the total composition:

| Composition | Weight Percent |
|---|---|
| Al$_2$O$_3$ | 19–20 |
| B$_2$O$_3$ | 28–30 |
| SiO$_2$ | 11–16 |
| LiO$_2$ | 4–8 |
| ZrO$_2$ | 4–7.5 |
| SnO$_2$ | 6–19 |
| La$_2$O$_3$ | 0–0.5 |
| CaO | 0–4 |
| SrO | 0–13 |
| BaO | 0–7 |
| Na$_2$O | 0–0.25 |
| F | 0–1.5 |

3. The glass frit composition according to claim 1 and consisting essentially of the following components present in the indicated weight percent ranges based on the total composition:

| Component | Weight Percent |
|---|---|
| Al$_2$O$_3$ | 15–30 |
| B$_2$O$_3$ | 16–32 |
| Li$_2$O | 4–12 |
| SiO$_2$ | 11–40 |
| ZrO$_2$ | 3–6.5 |
| SnO$_2$ | 0–20 |
| CeO$_2$ | 0–2 |
| La$_2$O$_3$ | 0–6 |
| CaO | 0–16 |
| SrO | 0–13 |
| BaO | 0–7 |
| Na$_2$O | 0–3.5 |
| F | 0–3 | wherein

| | | |
|---|---|---|
| Σ SnO$_2$ + CaO | is | 9 to 23% |
| Σ ZrO$_2$ + La$_2$O$_3$ | is | 3 to 7% |
| Σ ZrO$_2$ + Al$_2$O$_3$ | is | 23 to 26.5% |
| Σ CaO + SrO + BaO | is | 7 to 19.25% |

4. The glass frit composition according to claim 1 and consisting essentially of the following components present in the indicated weight percent ranges based on the total composition:

| Composition | Weight Percent |
|---|---|
| Al$_2$O$_3$ | 15–30 |
| B$_2$O$_3$ | 16–32 |
| Li$_2$O | 4–12 |
| SiO$_2$ | 11–40 |
| ZrO$_2$ | 4–6.5 |
| SnO$_2$ | 0–20 |
| CeO$_2$ | 0–2 |
| La$_2$O$_3$ | 0–6 |
| CaO | 0–16 |
| SrO | 0–13 |
| BaO | 0–7 |
| Na$_2$O | 0–3 |
| F | 0–1.5 | wherein generally:

| | | |
|---|---|---|
| Σ SnO$_2$ + CaO | is | 10 to 23% |
| Σ ZrO$_2$ + La$_2$O$_3$ | is | 4 to 6.5% |
| Σ ZrO$_2$ + Al$_2$O$_3$ | is | 24 to 26.5% |
| Σ CaO + SrO + BaO | is | 7 to 19.25% |

5. The glass frit composition according to claim 1 and consisting essentially of the following components present in the indicated weight percent ranges based on the total composition:

| Component | Weight Percent |
|---|---|
| Al$_2$O$_3$ | 0–2 |
| B$_2$O$_3$ | 24–32 |
| Li$_2$O | 5–9 |
| SiO$_2$ | 16–40 |
| ZrO$_2$ | 0–18 |
| SnO$_2$ | 0–10 |
| La$_2$O$_3$ | 13–15 |
| CaO | 0–10 |
| SrO | 0–3 |
| Na$_2$O | 0–3 | wherein

| | | |
|---|---|---|
| Σ SnO$_2$ + CaO | is | 2–10% |
| Σ ZrO$_2$ + La$_2$O$_3$ | is | 15–33% |
| Σ ZrO$_2$ + Al$_2$O$_3$ | is | 0–18% |
| Σ CaO + SrO + BaO | is | 0–10% |

6. The glass frit composition according to claim 1 and consisting essentially of the following components present in the indicated weight ranges based on the total composition:

| Component | Weight Percent |
|---|---|
| B$_2$O$_3$ | 24–30 |
| Li$_2$O | 5–9 |
| SiO$_2$ | 28–40 |
| ZrO$_2$ | 3–18 |
| SnO$_2$ | 0–2 |
| La$_2$O$_3$ | 13–15 |
| CaO | 0–9 |
| Na$_2$O | 0–3 | and wherein:

| | | |
|---|---|---|
| Σ SnO$_2$ + CaO | is | 2–9% |
| Σ ZrO$_2$ + La$_2$O$_3$ | is | 17–33% |
| Σ CaO + SrO + BaO | is | 0–9% |

7. The glass frit composition according to claim 1 consisting essentially of the following components present in the indicated weight percent ranges based on the total composition:

| Component | Weight Percent |
| --- | --- |
| $Al_2O_3$ | 19.7 |
| $B_2O_3$ | 28.25 |
| $Li_2O$ | 7.50 |
| $SiO_2$ | 12.75 |
| $ZrO_2$ | 6.10 |
| $SnO_2$ | 14.22 |
| $La_2O_3$ | 0.5 |
| CaO | 4 |
| BaO | 5.25 |
| $Na_2O$ | 0.8 |
| F | 0.93 |

8. The glass frit composition according to claim 1 consisting essentially of the following components present in the indicated weight percent ranges based on the total composition:

| Component | Weight Percent |
| --- | --- |
| $Al_2O_3$ | 20 |
| $B_2O_3$ | 28 |
| $Li_2O$ | 8 |
| $SiO_2$ | 14 |
| $ZrO_2$ | 6.5 |
| $SnO_2$ | 15 |
| CaO | 3 |
| SrO | 4 |
| F | 1.5 |

9. The glass frit composition according to claim 1 consisting essentially of the following components present in the indicated weight percent ranges based on the total composition:

| Composition | Weight Percent |
| --- | --- |
| $Al_2O_3$ | 20 |
| $B_2O_3$ | 28 |
| $Li_2O$ | 8 |
| $SiO_2$ | 11 |
| $ZrO_2$ | 6.5 |
| $SnO_2$ | 19 |
| BaO | 7 |
| F | 0.5 |

10. The glass frit composition according to claim 1 consisting essentially of the following components present in the indicated weight percent ranges based on the total composition:

| Component | Weight Percent |
| --- | --- |
| $Al_2O_3$ | 20 |
| $B_2O_3$ | 30 |
| $Li_2O$ | 4 |
| $SiO_2$ | 15 |
| $ZrO_2$ | 4 |
| $SnO_2$ | 6 |
| CaO | 4 |
| SrO | 13 |
| BaO | 4 |

11. The glass frit composition according to claim 1 consisting essentially of the following components present in the indicated weight percent ranges based on the total composition:

| Component | Weight Percent |
| --- | --- |
| $Al_2O_3$ | 20 |
| $B_2O_3$ | 29 |
| $Li_2O$ | 6 |
| $SiO_2$ | 16 |
| $ZrO_2$ | 5 |
| $SnO_2$ | 7 |
| CaO | 3 |
| SrO | 11 |
| BaO | 3 |

12. A colored enamel for decorating glass, glass-ceramic and ceramic ware comprising frit as defined in claim 1 and from 4% to 15% of a low expansion filler or pigment, based on the weight of the glass frit.

13. The colored enamel of claim 12, wherein the filler is low expansion β-eucryptite.

14. A method of reducing stress in decorating compositions for application to glass, glass-ceramic and ceramic ware comprising incorporating from 5 to 15% of a low expansion filler into a glass frit as defined in claim 1.

* * * * *

UNITED STATES PATENT AND TRADEMARK OFFICE
CERTIFICATE OF CORRECTION

PATENT NO. : 4,446,241
DATED : May 1, 1984
INVENTOR(S) : Josef Francel, Daniel R. Stewart & Uriah Horn It is certified that error appears in the above-identified patent and that said Letters Patent are hereby corrected as shown below:

In the Abstract:

Line 4, "2-33% $SnO_2$ + CaO" should be --2-23% $SnO_2$ + CaO--

Line 4, "2-23% $ZrO_2$ + $La_2O_3$" should be --2-33% $ZrO_2$ + $La_2O_3$--

Col. 3, line 53, "+" should be --$\pm$--

Col. 3, line 67, "acid" should be --acids--

Signed and Sealed this

Twenty-seventh Day of November 1984

[SEAL]

Attest:

GERALD J. MOSSINGHOFF

Attesting Officer

Commissioner of Patents and Trademarks